Figure 1:
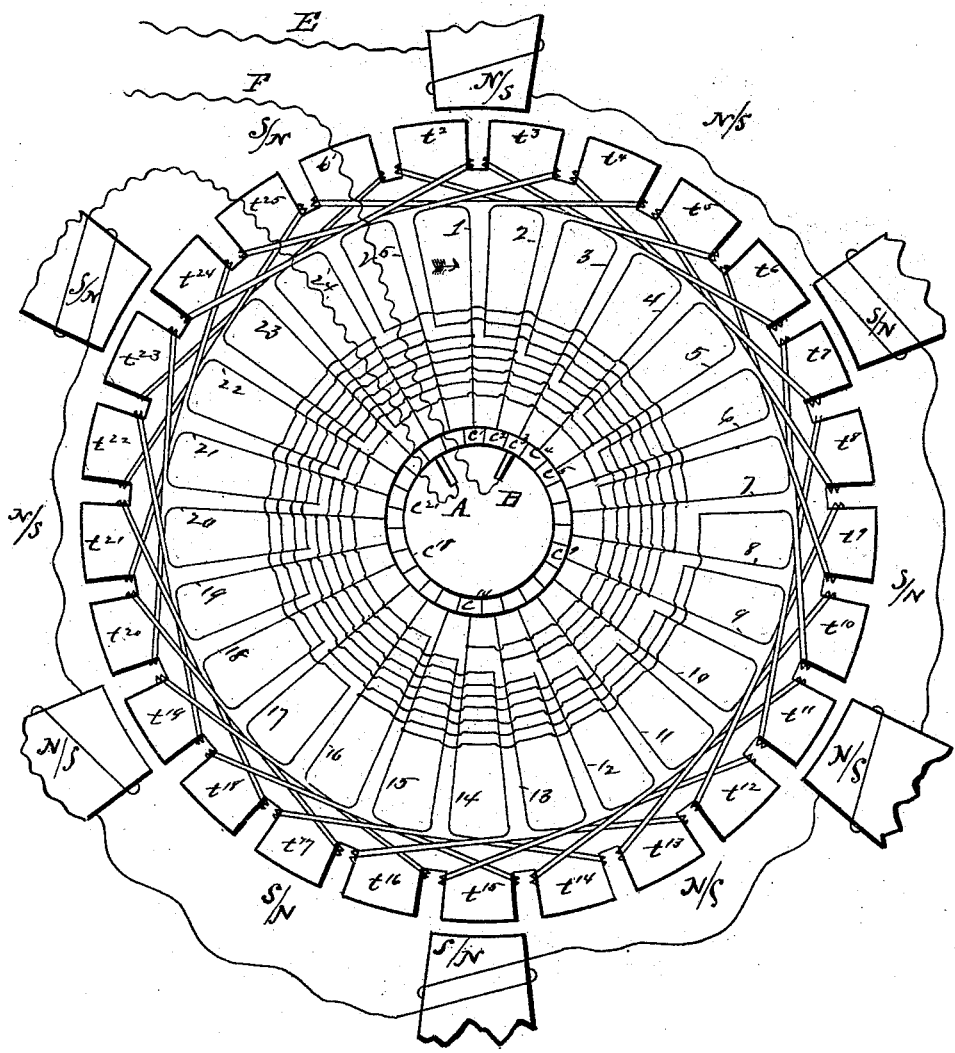

(No Model.) 2 Sheets—Sheet 1.

C. S. BRADLEY.
ALTERNATING CURRENT MOTOR.

No. 488,306. Patented Dec. 20, 1892.

(No Model.) 2 Sheets—Sheet 2.
C. S. BRADLEY.
ALTERNATING CURRENT MOTOR.

No. 488,306. Patented Dec. 20, 1892.

*Alternating Circuit*

Attest,
C. H. Benjamin.
E. C. Grigg.

Inventor,
Charles S. Bradley
by Read & Price
his attorneys

UNITED STATES PATENT OFFICE.

CHARLES S. BRADLEY, OF AVON, NEW YORK.

ALTERNATING-CURRENT MOTOR.

SPECIFICATION forming part of Letters Patent No. 488,306, dated December 20, 1892.

Application filed March 15, 1892. Serial No. 425,037. (No model.)

*To all whom it may concern:*

Be it known that I, CHARLES S. BRADLEY, a citizen of the United States, residing at Avon, in the county of Livingston and State of New York, have invented certain new and useful Improvements in Alternating-Current Motors; and I do hereby declare the following to be a full, clear, and exact description of the invention, such as will enable others skilled in the art to which it appertains to make and use the same.

This invention relates to a combined self-starting and synchronous alternating current motor, the object being to enable the machine to start by simply throwing on an alternating current, and when it attains a synchronous speed bringing into action a set of pole-pieces in the armature which will confront the operating pole-pieces of the field-magnet synchronously with the change of current on line, and thus give it the high efficiency common to synchronous motors.

The difficulty experienced in operating synchronous motors, as is well understood, is the difficulty of starting from a state of rest or re-starting when by reason of an overload it is thrown out of synchronism. Such motors as ordinarily constructed must develop a change of polarity in the armature synchronously with a change in the field-magnets or they will not operate at all.

In carrying out my invention I provide an armature wound with two circuits, one of which will start the machine from a state of rest and bring it up to synchronism, and the other of which arranged in shunt relation to the first will take but little current until the armature arrives at synchronism, when the high counter-electro-motive-force in the first circuit will force the current to traverse the second, and thus automatically throw the synchronous system into operation.

In prior applications filed by me, No. 370,723 of November 8, 1890, (Patent No. 460,046 of September 22, 1891), and No. 403,497 of August 22, 1891, I described a type of alternating current motor, in which the armature circuit was arranged in series relation to the field-magnet circuit and was fed with current from a commutator, which progressively shifted multiplicity of armature poles with relation to co-operating field-magnet poles, thus developing a high counter-electro-motive-force by reason of the multiplicity of poles, and increasing the efficiency of operation, as explained in said applications. In my present invention I utilize the system disclosed in said applications to start the motor into operation and bring it to synchronism, placing in shunt relation to the armature circuit an auxiliary armature circuit in which the poles remain fixed in the armature core, the reversal of polarity by reason of synchronism producing continuous rotation and developing a strong torque. I preferably use for the self-starting circuit a continuous closed coil winding connected with a commutator adapted to produce a progression of poles. The winding described in patent of Müller, No. 331,726 of December 1, 1885, is well adapted for this purpose. I wind a portion of the armature in accordance with this system, and wind the remaining portion with simple magnet coils connected in shunt relation to the first mentioned winding, these coils developing a series of poles in the armature in which the polarity does not shift progressively but remains fixed with relation to the core.

My invention therefore comprises a motor provided with an armature wound with two circuits, one of which develops a progression of the poles, as in ordinary drum wound machines, and the other of which produces a series of fixed poles, the two being placed in shunt relation to each other.

My invention also embodies other features which will be more particularly described in this specification and definitely indicated in the appended claims.

Figure 2:
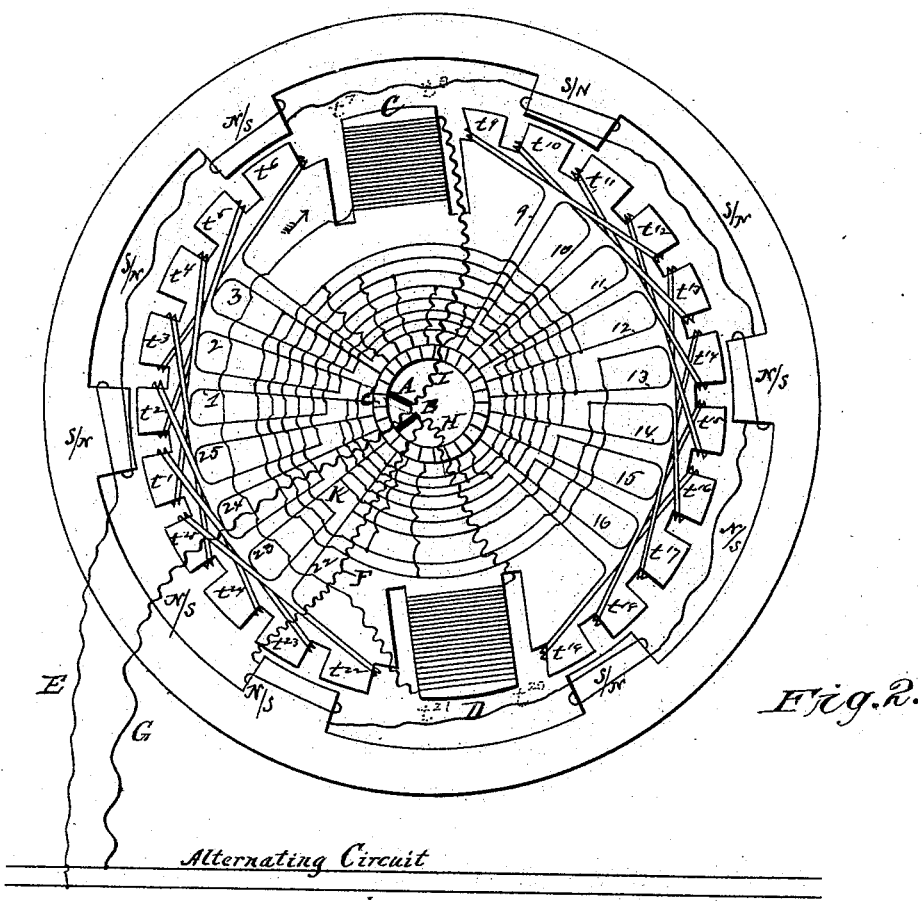
Figure 3:
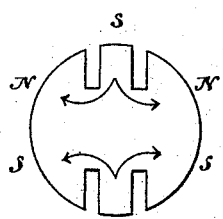

In the accompanying drawings which illustrate the invention, Figure 1 is a diagram illustrating a closed coil winding adapted for a multipolar machine, the entire surface of the armature being wound; Fig. 2 shows diagrammatically a motor constructed in accordance with my invention, only a part of the armature being covered with the style of winding illustrated in Fig. 1, the remaining part being provided with a simple spool winding; Fig. 3 is a diagram illustrating the distribution of poles formed by the spool winding.

The armature core is made up of a series of thin laminæ of iron, the periphery of which is indented so as to form a number of teeth, the grooves between the teeth being filled with the wire constituting the closed coil winding. As illustrated in Figs. 1 and 2, the armature is wound for a six-pole machine, and is provided with twenty-five teeth. A greater or smaller number of teeth might be used, the number being determined by a multiple of the number of field-magnet poles plus or minus one; for example, in a six-pole machine with twenty five teeth in the armature there are four times six plus one, or twenty-five teeth, four teeth being allotted to each pole. There are as many commutator blocks as there are teeth.

In winding the armature, if we start from any given block on the commutator, as, for example, 1, a number of courses of wire are laid in grooves inclosing four teeth, and are then carried past four teeth and wound about a group of four teeth beyond, after which another group of four is skipped, and the wire laid about the fifth group, and is thus carried around the armature, being laid in grooves inclosing four teeth successively, until all of the notches have been filled. It is evident that as there are twenty-five notches and each course of wire incloses four teeth, that two successive courses will not lie in the same grooves. The first layer will cover groups $t'$ to $t^4$, $t^9$ to $t^{12}$, $t^{17}$ to $t^{20}$; the next groups $t^{25}$ to $t^3$, $t^8$ to $t^{11}$, $t^{16}$ to $t^{19}$. Thus it will be seen that the second course drops behind the first one tooth and this will occur with the successive courses until all the notches have been filled, after which the end of the wire is connected with the commutator block from which the start was made. The commutator brushes may set upon commutator blocks $c'$ and $c^5$ or $c'$ and $c^9$ or $c'$ and $c^{13}$ or $c'$ and $c^{17}$, or in short upon any blocks which are a multiple of 4 plus 1. With such a winding a series of consequent poles are developed in the armature, which, in the case illustrated in Fig. 1, will be six in number, and if the armature is moved the distance of one tooth in the direction of the arrow the polar line, after the brush passes from one commutator segment to the next, will be shifted back, and thus continuous motion maintained. Such a machine when interposed in an alternating current circuit operates with a high degree of efficiency, by reason of the high counter-electro-motive-force developed in the armature because of the rapidity of cutting of lines of force. It does not however, operate with as great efficiency as synchronous motors, but possesses the advantage of starting from a state of rest. It also sparks at the commutator, thus heating the commutator after continued operation. I have therefore utilized such a winding in a synchronous motor in order to enable it to start and bring it to synchronism. An organization embodying these features is illustrated in Fig. 2, wherein an armature made up of laminated iron and indented so as to form teeth is provided with two long teeth C, D, diametrically opposite and wound with an ordinary spool winding and connected with the brushes in shunt relation to another armature circuit wound in accordance with the system illustrated in Fig. 1. The poles C and D are so wound as to develop opposite polarities at any instant, so that when they are in action a series of six poles will be developed in the armature, two being at C and D of opposite polarity, and the other four equi-distantly located about the armature, as will be understood from an inspection of Fig. 3. The surface of the armature not occupied by the pole-pieces C, D, is grooved so as to form teeth, twenty-five of which would cover the entire circumference. If the pole-pieces C, D, as illustrated in the drawings, with the necessary clearance for the coils, cover a space equal to say four teeth, the remaining twenty-one teeth would be wound as in Fig. 1, the commutator blocks for which there are no corresponding groups being cross-connected, or as shown in the drawings, connected to a coil surrounding an active group of teeth, so that when these commutator blocks arrive at the brush the current will enter the armature circuit at a point which will preserve the polar line of the armature in proper relation to the field-magnets.

The field-magnet and armature of the motor are connected in series relation, as illustrated, and successive poles of the field-magnet are of opposite polarity. Suppose current enters by conductor E, it will flow over the field-magnet coils, developing north and south poles, and entering the armature through conductor F and brush B will divide at K, and pass around the armature in opposite directions, re-uniting again at brush A and returning by conductor G. By following the two branches of the current it will be seen that they will develop north and south poles in adjacent portions of the armature on opposite sides of any field-magnet pole. During the movement of the armature when the brush passes from one commutator segment to the next the poles will be shifted backward relatively to the direction of movement of the armature a distance of one tooth, an operation which will be repeated continuously during the operation of the motor as successive commutator blocks connect with the brushes. By reason of the great self-induction of the shunt circuit covering pole-pieces C and D almost no current will flow through this circuit when the motor is starting; the continuous winding being then of low counter-electro-motive-force will carry the bulk of the current; but as the motor speeds up the counter-electro-motive-force of the closed coil winding forces more and more current into the spool winding; moreover as the armature approaches synchronism the self-induction of the spool winding decreases and when the motor arrives at synchronism the spool coils will take most of the current and develop a set of fixed poles in the armature, distributed as illustrated in Fig. 3. The machine will then operate as a synchronous motor, and will continue so until the current is switched off or the motor overloaded, in which case the relative increase of resistance in the two circuits will cause the closed coil winding to come into action again, and the machine will be brought up to synchronism. It will thus be seen that no switches or other mechanical contrivances are needed in order to convert the self-starting motor into a synchronous motor, and that a single armature may be used for the combined machine.

In laying on the continuous winding in the combined armature the courses are laid over the several groups of teeth in a manner similar to that explained in connection with Fig. 1, care being observed when any group of teeth includes any of the tooth spaces occupied by the poles C and D to skip forward on the armature to a group of teeth of the same sign which will occupy such a position that a full group may be covered by the winding; for example, if the winding were started at a point 1, the group of teeth $t'$, $t^2$, $t^3$, $t^4$ will be wound and the wire then carried forward and laid about teeth $t^9$, $t^{10}$, $t^{11}$, $t^{12}$, and again carried forward to a point where it would surround $t^{17}$, $t^{18}$, $t^{19}$, $t^{20}$, but inasmuch as the space which would have been occupied by the tooth $t^{20}$ is utilized for the pole D a simple connection with the commutator block $c^{17}$ is made, and the wire carried forward and laid about teeth $t^{25}$, $t'$, $t^2$, $t^3$ the winding being continued in this manner until all of the grooves are filled. When any of the commutator blocks corresponding to the spaces occupied by poles C and D come into contact with the brushes the current will thus enter the continuous winding at a proper point to preserve a proper relation of the field-magnet and armature poles.

Briefly stated, the continuous winding is simply omitted from the space covered by the poles C and D, the remaining surface of the armature being covered. Such omission serves only to somewhat weaken the torque of the armature on starting, but does not in anywise affect the principle of its operation.

If desired, more than two synchronous poles such as C and D might be made in the armature, and the motor may, of course, be wound for any number of field-magnet poles.

Having thus described my invention what I claim as new and desire to secure by Letters Patent, is:—

1. An alternating current motor provided with a self-starting and a synchronous winding on its armature, the two being arranged in shunt relation.

2. A combined self-starting and synchronous alternating current motor having two circuits both connected to the supply terminals, the synchronous circuit being wound to offer at starting high counter-electro-motive-force relatively to the self-starting circuit.

3. The combined self-starting and synchronous alternating current motor provided with a common field-magnet circuit and two armature circuits in shunt relation, the self-starting circuit being of low counter-electro-motive-force relatively to the synchronous circuit.

4. A combined self-starting and synchronous alternating current motor having two armature circuits in shunt relation to each other, the self-starting circuit being provided with a commutator to maintain a progression of the polar line, and the synchronous circuit being adapted to offer a higher counter-electro-motive-force when the motor is starting and wound to maintain fixed poles in the armature core.

5. A multipolar alternating current motor provided with two windings in shunt relation, one provided with a commutator to maintain a progression of the polar line, and the other wound to oppose high counter-electro-motive-force when the motor is out of synchronism, and adapted to maintain fixed poles in the armature core, whereby the latter will take but little current until the motor attains synchronism.

6. An alternating current motor provided with two armature circuits, one being continuously wound and connected with a commutator to maintain a progression of the polar line, the other being wound to maintain fixed poles in the armature core and offer high counter-electro-motive-force to flow of current when out of synchronism, and a common field-magnet circuit.

In testimony whereof I affix my signature in presence of two witnesses.

CHARLES S. BRADLEY.

Witnesses:
ROBT. H. READ,
VICTOR E. BURKE.